Patented Apr. 2, 1929.

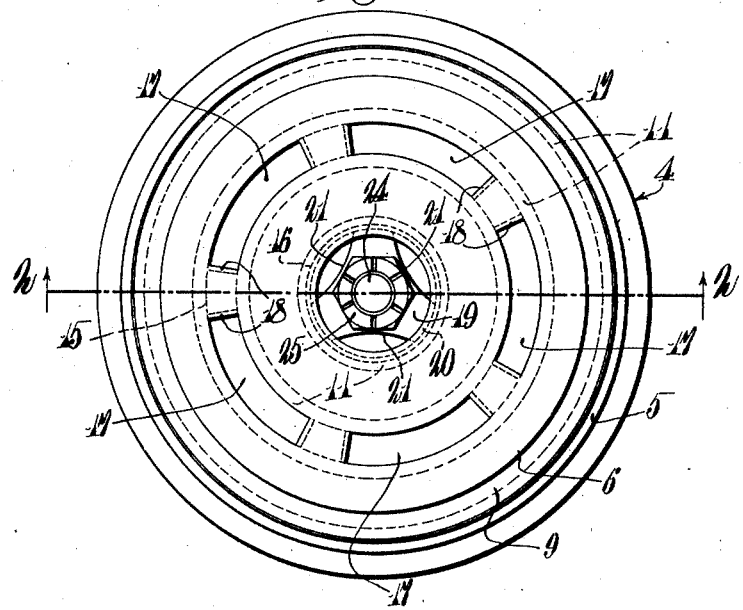

1,707,306

UNITED STATES PATENT OFFICE.

FRED D. HOLDSWORTH, OF CLAREMONT, NEW HAMPSHIRE, ASSIGNOR TO SULLIVAN MACHINERY COMPANY, A CORPORATION OF MASSACHUSETTS.

VALVE MECHANISM.

Application filed January 21, 1922. Serial No. 530,925.

My invention relates to valve mechanisms, and more particularly to improved valve mechanisms for use in connection with air compressors, pumps or similar devices.

An object of my invention is to provide an improved valve mechanism. Another object of my invention is to provide an improved and simplified valve mechanism giving large port area in a relatively small space. A further object of my invention is to provide an improved valve mechanism in which the machining operations shall be relatively few and as many parts as possible shall be made up by stamping or by similar processes. Other objects and advantages of my invention will hereinafter more fully appear.

In the accompanying drawings I have shown for purposes of illustration one form which my invention may assume in practice.

In these drawings,—

Fig. 1 is a plan view of a discharge valve constructed according to the illustrative embodiment of my invention.

Fig. 2 is a transverse section on the line 2—2 of Fig. 1.

Fig. 3 is a plan and an edge view of a spring used in the illustrative form of my improved valve mechanism.

Fig. 4 is an edge view of the guard partially broken away to facilitate illustration.

In the form of my invention which I have selected to disclose for purposes of illustration, it will be observed that I have illustrated a fragment of a compressor cylinder 1 in which a valve cage receiving chamber 2 is formed, but it will be understood that the chamber 2 might equally well be formed in the head member of a compressor cylinder if desired. The cage receiving chamber 2 is provided at its lower edge with a seating surface 3 upon which a valve mechanism constructed in accordance with the illustrative form of my invention is seated. This valve mechanism is generally designated 4 and comprises a seat member 5, a guard member 6, independent valve members 7 and 8, and springs 9 and 10.

The seat member 5 is provided at its upper side with a seating surface which is made up of a number of beads in elevation 11, these beads or annuli all being ground off to a common plane. It will be noted that annular grooves 12 extend completely around the top of the member 5 between certain pairs of annuli or beads and serve to constitute annular ports, and that with these grooves 12 suitable passages 13, traversing the remaining thickness of the seat member 4, communicate. Between the grooves 12, of which two are shown herein, is arranged a shallow groove 15 which cooperates in forming certain of the beads or annuli 11 previously referred to and also provides a socket in which the guiding elements of the guard member 6 may be received. The seat member 5 is counterbored slightly at its central portion as indicated at 16 to provide an innermost bead or annulus. The guard member is formed from an annular disc of relatively thin sheet metal by a stamping or drawing process. It will be noted that it is traversed by a series of flow slots 17; and the metal which previous to the stamping operation filled these flow slots has been slit at the median point of the length of these slots and then bent down in opposite directions to form guiding elements or wings 18. It will also be noted that by a punching, spinning, or drawing process, the central portion of the plate of which the guard 6 is made is depressed to form a flat bottom 19 with guiding walls 20; and that in order to provide an additional series of flow passages, portions of the material of the guiding walls 20 and of the bottom 19 are ground out as indicated at 21. When the guard member has been finished as described, it is brought into contact with a grinder, and all the downwardly extending surfaces are ground to a single plane.

The valves which are annular in shape and formed of relatively thin sheet metal, are shown at 7 and 8, and are concentrically arranged over the grooves 12 and of such size as to be guided at their adjacent edges by the depending guide members 18 which seat in the grooves 15. The valve member 8 is guided at its inside by the guiding surfaces 20. The springs 9 and 10 are made up of relatively thin sheet metal similar in contour to the valve members 7 and 8 and are then passed through rolls which bow them transversely. Having had their ends upturned, the springs are disposed upon the valves and, upon placing of the guard in position with the members 18 in the groove 15, the valve is ready for permanent assembly which is accomplished by means of a bolt 24 and nut 25.

It will be evident that as air is compressed in the cylinder when the pressure rises to a sufficient height, the air within the cylinder will act by way of ports 13 and grooves 12 upon the lower surfaces of the valve rings 7 and 8 and will unseat them, tending to flatten the springs 9 and 10; and that upon opposite movement of the piston the valves will be closed by their springs. During opening and closing movements of the valves, they will be guided by the guiding elements on the combined guard and guide members and thereby caused to seat and open smoothly and evenly.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a valve mechanism, a valve seat member providing concentric valve seats, separate concentrically disposed annular valves, separate annular springs cooperating with said valves, and common guiding means for said springs and valves having wings intermediate said valves and cooperating to directly hold said springs and valves in position.

2. In a valve mechanism, a valve seat member having concentric valve seating surfaces spaced by an annular groove, a sheet metal guard and guide member having pairs of closely adjacent guiding elements seating in said groove, valves on said seats, and springs between said guard and seat member.

3. In a valve mechanism, a valve seat member having concentric valve seat surfaces and sockets at opposite sides of the innermost one of said surfaces, a sheet metal guard member having portions seating in said sockets, separate valves on said seat surfaces, and springs, one individual to each valve, between said valves and said guard member.

4. In a valve mechanism, a valve seat member having concentric valve seat surfaces and sockets at opposite sides of one of said surfaces, a guard member having portions seating in said sockets, means whereby said inner socket forms an initial clamping surface when said guard is in operative position, separate annular valves on said seat surfaces, and annular transversely bowed springs, one between each of said valves and said guard member.

5. In a valve mechanism, a valve seat member having concentric valve seat surfaces and sockets at opposite sides of one of said surfaces, a sheet metal guard member having portions seating in said sockets, separate annular valves on said seat surfaces, and annular springs one between each of said valves and said guard member engaging both of the same.

6. In a valve mechanism, a valve seat member having concentric valve seat surfaces and sockets at opposite sides of one of said surfaces, a guard member having finger portions seating in one of said sockets and having a central portion providing guiding means seating in the inner one of said sockets, means whereby said central portion forms an initial clamping means for said guide, separate annular valves on said seat surfaces, and separate annular springs between said valves and said guard member and guided by the latter.

7. In a valve mechanism, a valve seat member having concentric valve seat surfaces, a sheet metal guard disposed parallel to the plane of said surfaces and held in spaced relation thereto by means of guiding elements comprising a central hub portion cut away to provide flow passages and also comprising guiding elements radially spaced from said hub portion, and separate concentric valves cooperating with said seat surfaces and guided by opposite edges of said guiding elements.

8. As an article of manufacture, a sheet metal valve guard comprising a guard plate perforated to provide flow passages and having integral guiding fingers, said fingers comprising strips bent from said flow passages and arranged substantially perpendicular to the surface of said guard plate at the ends of said flow passages.

9. In a valve mechanism, a valve seat structure providing a valve seat, a valve associated with said seat, and a sheet metal guard for said valve comprising a body portion having free-ended fingers bent therefrom about radial lines to provide flow slots and projecting angularly from said guard, said fingers being disposed edgewise to the valve and adapted to space the guard a predetermined distance from the valve seat.

10. An article of manufacture comprising a substantially circular one-piece sheet metal valve guard having a generally flat guard surface and finger portions integral therewith, spaced inwardly from the outer periphery of said guard and disposed substantially perpendicular to said flat surface in planes including radial lines in said guard, said guard having flow slots therein between said finger portions and there being two finger portions individual to each slot.

11. An article of manufacture comprising a sheet metal valve guard having a generally flat guard surface and guiding and positioning free-ended fingers integral therewith and bent therefrom about radial lines and disposed substantially perpendicular to the flat guard surface, said guard having flow slots therein adjacent the fingers, in which said fingers might be received if bent down into the plane of the guard surface.

In testimony whereof I affix my signature.

FRED D. HOLDSWORTH.

CERTIFICATE OF CORRECTION.

Patent No. 1,707,306.  Granted April 2, 1929, to

FRED D. HOLDSWORTH.

It is hereby certified that error appears in the printed specification of the above numbered patent requiring correction as follows: Page 2, line 126, claim 11, for the word "bent" read "rebent"; and that the said Letters Patent should be read with this correction therein that the same may conform to the record of the case in the Patent Office.

Signed and sealed this 7th day of May, A. D. 1929.

(Seal)

M. J. Moore,
Acting Commissioner of Patents.